(12) United States Patent
Choi et al.

(10) Patent No.: US 10,564,843 B2
(45) Date of Patent: Feb. 18, 2020

(54) DISPLAY DEVICE AND METHOD OF DISPLAYING SCREEN ON SAID DISPLAY DEVICE

(71) Applicant: Samsung Electronics Co., Ltd., Suwon-si, Gyeonggi-do (KR)

(72) Inventors: Jung-hwan Choi, Seoul (KR); Young-jin Kim, Suwon-si (KR); Tae-soo Kim, Suwon-si (KR); Kang-tae Kim, Seongnam-si (KR); Tae-hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 14/912,783

(22) PCT Filed: Aug. 13, 2014

(86) PCT No.: PCT/KR2014/007540
§ 371 (c)(1),
(2) Date: Feb. 18, 2016

(87) PCT Pub. No.: WO2015/026099
PCT Pub. Date: Feb. 26, 2015

(65) Prior Publication Data
US 2016/0196057 A1 Jul. 7, 2016

(30) Foreign Application Priority Data

Aug. 22, 2013 (KR) .................. 10-2013-0099928

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS 8,208,964 B2 6/2012 Dobroth et al.
9,507,512 B1* 11/2016 Turner .................. G06F 3/0488
(Continued)

FOREIGN PATENT DOCUMENTS

KR 10-2007-0001771 A 1/2007
KR 10-2011-0063409 A 6/2011

OTHER PUBLICATIONS

Torbjorn Hovden, Multi-Finger Button and Scroll Region Interactions, IP.com Electronic Publication, Sep. 23, 2008, pp. 1-9 (Year: 2008).*

(Continued)

*Primary Examiner* — Tam T Tran
(74) *Attorney, Agent, or Firm* — Jefferson IP Law, LLP

(57) ABSTRACT

A method of displaying for allowing a plurality of application windows to be easily controlled and a display device therefor are provided. A method of displaying a screen on a display device includes displaying a button on a touch screen; splitting the touch screen into a plurality of regions based on the position at which the button is displayed, receiving a touch input to move a displayed button, obtaining a slope value of a line connecting a start point of the touch input to an end point thereof, selecting a region corresponding to the slope value from among the plurality of regions split, and moving the button to a certain position included in a selected region.

11 Claims, 18 Drawing Sheets

(51) Int. Cl.
*G06F 3/0481* (2013.01)
*G06F 3/0484* (2013.01)

(52) U.S. Cl.
CPC ...... *G06F 3/04845* (2013.01); *G06F 3/04883* (2013.01); *G06F 2203/04803* (2013.01)

(56) References Cited

U.S. PATENT DOCUMENTS

| | | |
|---|---|---|
| 2007/0101289 A1 | 5/2007 | Awada et al. |
| 2009/0070093 A1* | 3/2009 | Nakanishi ............... A63F 13/00 703/22 |
| 2010/0097338 A1* | 4/2010 | Miyashita ........... G06F 3/04883 345/173 |
| 2011/0105187 A1* | 5/2011 | Dobroth ................ G06F 3/0481 455/566 |
| 2011/0175930 A1 | 7/2011 | Hwang et al. |
| 2011/0210850 A1* | 9/2011 | Tran .................... G06F 3/04883 340/540 |
| 2012/0244913 A1 | 9/2012 | Dobroth et al. |
| 2012/0290966 A1* | 11/2012 | Chae ........................ G09G 5/14 715/778 |
| 2013/0147849 A1* | 6/2013 | Kwak ...................... G09G 5/14 345/666 |
| 2014/0173498 A1 | 6/2014 | Chae et al. |

OTHER PUBLICATIONS

IBM, Automatic positioning of taskbar button relative to the position of application windows, IP.com Electronic Publication, Mar. 9, 2009, pp. 1-3 (Year: 2009).*

* cited by examiner

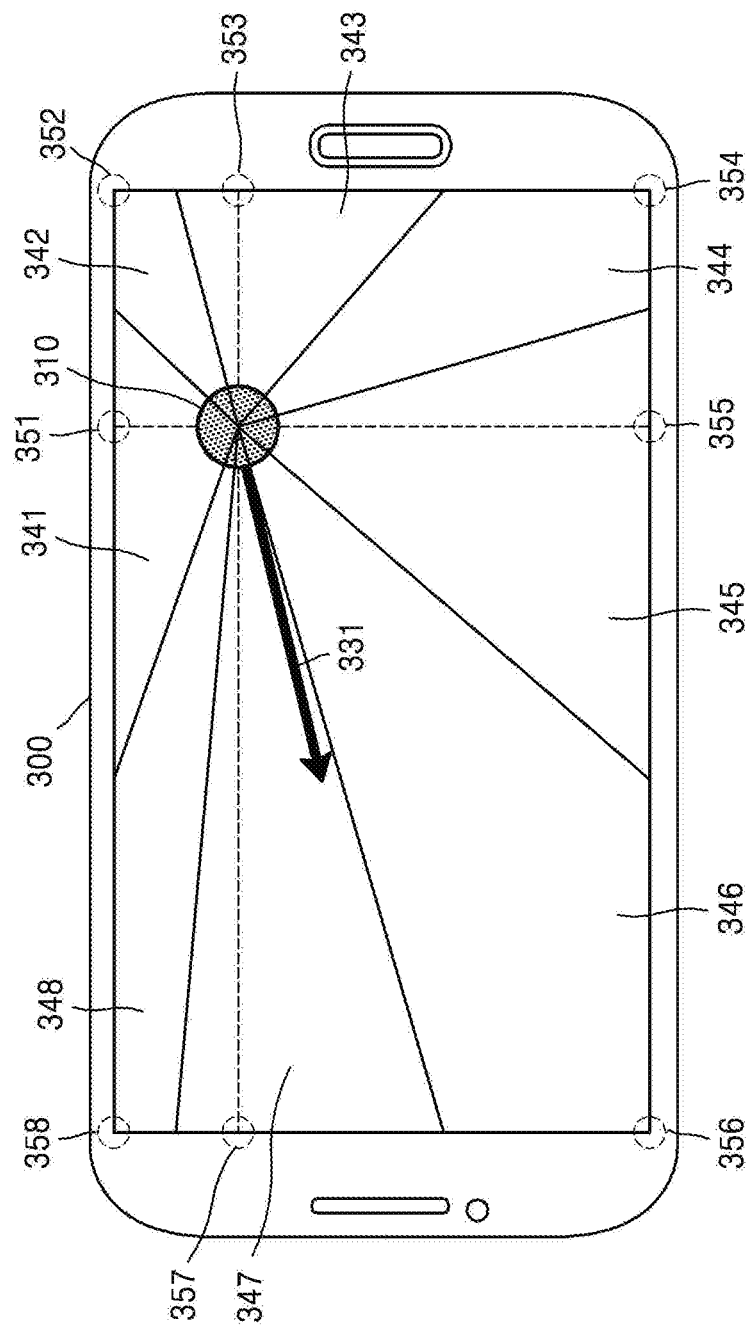

DISPLAY DEVICE AND METHOD OF DISPLAYING SCREEN ON SAID DISPLAY DEVICE

TECHNICAL FIELD

The present disclosure relates to methods of displaying screens on display devices and display devices using the methods, and more particularly, to methods of displaying at least one application execution screen on display devices and display devices using the method.

BACKGROUND ART

A desktop computer or a mobile device (e.g., a mobile phone, a smartphone, or a tablet PC) having a touch screen may also include at least one display device.

In the case of a desktop computer, a user may divide a screen of a display device according to work environments. When a web browser is opened, a 'page up' button or a 'page down' button on a keyboard may be used to move a web page up or down. When a mouse is used instead of the keyboard, a scroll bar at a side of the web page may be selected by using a cursor of the mouse to move the web page up or down.

In comparison, a mobile device has a relatively small output screen size and input methods thereof are limited. It may be difficult to divide a screen of the mobile device and use the mobile device.

Also, along with the size reduction of high-performance hardware, various applications may be executed in the mobile device. Basic applications that are installed in the mobile device by a manufacturer and various applications that are developed by general users may be executed in the mobile device.

Although various applications for satisfying user demands are provided in the mobile device, since the mobile device is manufactured to have a portable size, a display size and a user interface (UI) are limited. Therefore, it may be inconvenient for the user to execute a plurality of applications in the mobile device. For example, an application execution screen is displayed on an entire area of a display of the mobile device to execute a single application. Afterward, in order to execute another application, the displayed application has to be closed first, and then the other application has to be executed. That is, execution and closing processes for each application have to be repeated in the mobile device to execute various applications.

Therefore, a technology for displaying a plurality of application execution windows on a display has to be developed. Also, when the plurality of application execution windows are displayed, a user interface for controlling the plurality of application execution windows as a user desires is necessary.

DETAILED DESCRIPTION OF THE INVENTION

Technical Problem

Provided are a method of displaying a screen for easily controlling a plurality of application execution windows when the plurality of application execution windows are displayed on a display in a display device and a display device using the method.

Technical Solution

According to an aspect of an embodiment, a method of displaying a screen on a display device including a touch screen includes displaying a button on the touch screen; splitting the touch screen into a plurality of regions based on a position of the displayed button; receiving a touch input to move the displayed button; obtaining an inclination value of a line connecting start and end points of the touch input; selecting a region, from among the plurality of split regions, corresponding to the inclination value; and moving the displayed button to a certain position in the selected region.

The obtaining of the inclination value may include obtaining an acceleration value of a movement of the displayed button, and, when the acceleration value is greater than a preset threshold value, obtaining the inclination value.

The certain position may be included in an edge region of the touch screen.

The splitting of the touch screen into the plurality of regions may include splitting the touch screen into the plurality of regions based on lines connecting the position of the displayed button and a plurality of preset points of an edge region of the touch screen.

The obtaining of the inclination value may include determining a coordinate of the touch input prior to a preset number from the end point of the touch input as the start point of the touch input.

According to an aspect of an embodiment, a display device includes a touch screen configured to display a button; and a controller configured to split the touch screen into a plurality of regions based on a position where the button is displayed, wherein the touch screen configured to receive a touch input to move the displayed button, and wherein the controller configured to obtain an inclination value of a line connecting start and end points of the touch input, select a region, from among the plurality of split regions, corresponding to the inclination value, and control the touch screen to move and display the button to a certain position in the selected region.

The controller may be further configured to obtain an acceleration value of a movement of the button, and, when the acceleration value is greater than a preset threshold value, to control the touch screen to display the button at the certain position.

The certain position may be in an edge region of the touch screen.

The controller may be further configured to split the touch screen into the plurality of regions based on lines connecting the position where the button is displayed and a plurality of preset points of an edge region of the touch screen.

The controller may be further configured to determine a coordinate of the touch input before a preset number from the end point of the touch input as the start point of the touch input.

According to an aspect of an embodiment, there is a non-transitory computer-readable recording medium having recorded thereon a program, which, when executed by a computer, performs the method.

Advantageous Effects of the Invention

A user interface displaying a screen for easily controlling a plurality of application execution windows may be provided to a user.

DESCRIPTION OF THE DRAWINGS

FIGS. 3A through 3E are conceptual diagrams for describing a method of moving positions of buttons, according to an embodiment.

BEST MODE

Figure 1:
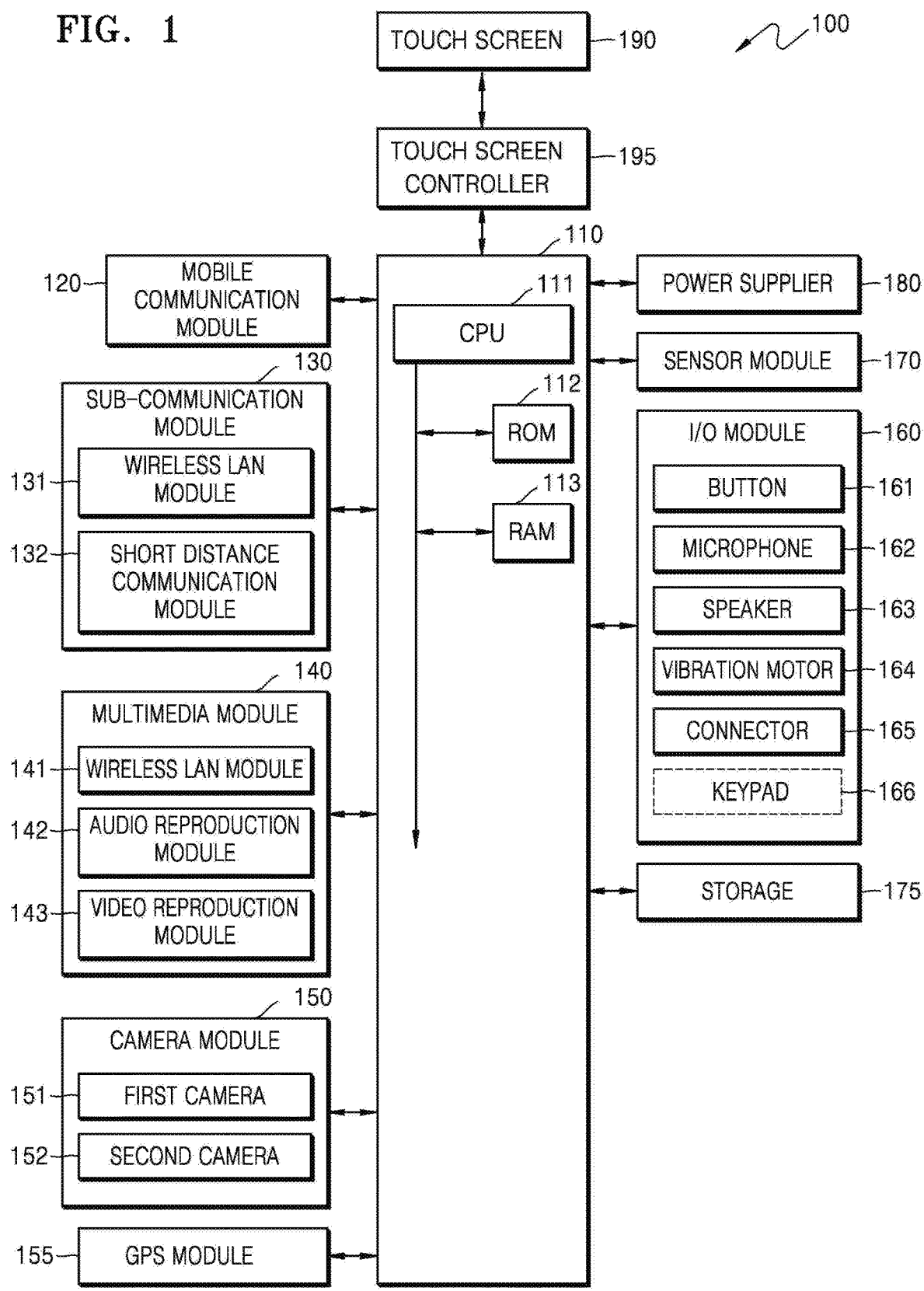
FIG. 1 is a block diagram of a display device according to an embodiment.

According to an aspect of an embodiment, a method of displaying a screen on a display device comprising a touch screen is provided. The method includes displaying a button on the touch screen, splitting the touch screen into a plurality of regions based on a position of the displayed button, receiving a touch input to move the displayed button, obtaining an inclination value of a line connecting start and end points of the touch input, selecting a region, from among the plurality of split regions, corresponding to the inclination value, and moving the displayed button to a certain position in the selected region.

According to an aspect of another embodiment, a display device is provided. The display device includes a touch screen configured to display a button, and a controller configured to split the touch screen into a plurality of regions based on a position where the button is displayed, wherein the touch screen configured to receive a touch input to move the displayed button, and wherein the controller configured to obtain an inclination value of a line connecting start and end points of the touch input, select a region, from among the plurality of split regions, corresponding to the inclination value, and control the touch screen to move and display the button to a certain position in the selected region.

According to an aspect of another embodiment, provided is a non-transitory computer-readable recording medium having recorded thereon a program, which, when executed by a computer, performs the method described above.

MODE OF THE INVENTION

Hereinafter, embodiments will now be described more fully with reference to the accompanying drawings so that this disclosure will be thorough and complete, and will fully convey the embodiments to one of ordinary skill in the art. The embodiments may, however, be embodied in many different forms and should not be construed as being limited to the embodiments set forth herein. Features that are unnecessary for clearly describing the embodiments are not included in the drawings. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a portion "includes" an element, another element may be further included, rather than excluding the existence of the other element, unless otherwise described. As used herein, the term "and/or" includes any and all combinations of one or more of the associated listed items.

In the present specification, the term "touch" or "touch input" may indicate not only a direct physical contact with a display device, but also input of information when the display device detects approach of a body's part (e.g., a finger) of a user.

Hereinafter, the embodiments will be described in detail with reference to the accompanying drawings.

FIG. 1 is a block diagram of a display device 100 according to an embodiment. FIG. 1 merely illustrates a display device according to an embodiment. A display device according to the embodiments may include more or less components than those illustrated in FIG. 1.

The display device 100 may be connected to an external device (not shown) by using a mobile communication module 120, a sub-communication module 130, and a connector 165. The external device may include at least one selected from another device (not shown), a cellular phone (not shown), a smartphone (not shown), a tablet PC (not shown), and a server (not shown).

Referring to FIG. 1, the display device 100 may include a touch screen 190 and a touch screen controller 195. Also, the display device 100 may include a controller 110, the mobile communication module 120, the sub-communication module 130, a multimedia module 140, a camera module 150, a GPS module 155, an input/output (I/O) module 160, a sensor module 170, a storage 175, and a power supplier 180. The sub-communication module 130 may include at least one selected from a wireless LAN module 131 and a short distance communication module 132, and the multimedia module 140 may include at least one selected from a broadcasting communication module 141, an audio reproduction module 142, and a video reproduction module 143. The camera module 150 may include at least one selected from a first camera 151 and a second camera 152, and the I/O module 160 may include at least one selected from a button 161, a microphone 162, a speaker 163, a vibration motor 164, the connector 165, and a keypad 166.

The controller 110 may include a central processing unit (CPU) 111, a ROM 112 that stores a control program for controlling the display device 100, and a RAM 113 that stores signals or data that is input from the outside of the display device 100 or is used as a memory space for operations performed by the display device 100. The CPU 111 may include a plurality of processors, such as a single-core processor, a dual-core processor, a triple-core processor, or a quad-core processor. The CPU 111, the ROM 112, and the RAM 113 may be connected to each other via an internal bus.

The controller 110 may control the mobile communication module 120, the sub-communication module 130, the multimedia module 140, the camera module 150, the GPS module 155, the I/O module 160, the sensor module 170, the storage 175, the power supplier 180, the touch screen 190, and the touch screen controller 195.

Under the control of the controller 110, the mobile communication module 120 may connect the display device 100 to an external device via mobile communication by using at least one (one or a plurality of) antenna (not shown). The mobile communication module 120 may transmit/receive wireless signals for voice calls, video calls, and transmissions of short messages (SMS) or multimedia messages (MMS) with a cellular phone (not shown) of which a contact number is input to the display device 100, a smartphone (not shown), a tablet PC (not shown), or other devices (not shown).

The sub-communication module 130 may include at least one selected from the wireless LAN module 131 and the short distance communication module 132. For example, only the wireless LAN module 131, only the short distance communication module 132, or both of the wireless LAN module 131 and the short distance communication module 132 may be included.

The wireless LAN module 131 may be controlled by the controller 110 such that the wireless LAN module 131 is connected with the Internet at a place where a wireless access point (AP) (not shown) is provided. The wireless LAN module 131 may support the wireless LAN standard IEEE 802.11x of the Institute of Electrical and Electronics Engineers (IEEE). The short distance communication module 132 may be controlled by the controller 110 such that the short distance communication module 132 performs a short distance wireless communication between the display device 100 and an imaging apparatus (not shown). Examples of short distance wireless communication techniques may include Bluetooth, Infrared Data Association (IrDA), and ZigBee.

Based on performance, the display device 100 may include at least one selected from the mobile communication module 120, the wireless LAN module 131, and the short distance communication module 132.

The multimedia module 140 may include the broadcasting communication module 141, the audio reproduction module 142, or the video reproduction module 143. The broadcasting communication module 141 may be controlled by the controller 110 and receive broadcasting signals (e.g., TV broadcasting signals, radio broadcasting signals, or data broadcasting signals) and additional broadcasting information (e.g., an electric program guide (EPG) or an electric service guide (ESG)) transmitted from broadcasting stations via a broadcasting communication antenna (not shown). The audio reproduction module 142 may be controlled by the controller 110 and reproduce stored or received digital audio files. The video reproduction module 143 may be controlled by the controller 110 and reproduce stored or received digital video files. The video reproduction module 143 may reproduce digital audio files.

The multimedia module 140 may include the audio reproduction module 142 and the video reproduction module 143, and not include the broadcasting communication module 141. Alternatively, the audio reproduction module 142 or the video reproduction module 143 of the multimedia module 140 may be included in the controller 110.

The camera module 150 may include at least one selected from the first camera 151 and the second camera 152 which capture a still image or a video under the control of the controller 110. Also, the first camera 151 or the second camera 152 may include an auxiliary light source (not shown) that provides an amount of light that is necessary for photography. The first camera 151 may be located at a front side of the display device 100, and the second camera 152 may be located at a back side of the display device 100. Alternatively, the first camera 151 and the second camera 152 may be adjacently (e.g., a distance greater than 1 cm but smaller than 8 cm) located and capture a 3-dimensional (3D) still image or a 3D video.

The GPS module 155 may receive radio waves from a plurality of GPS satellites (not shown) in the Earth's orbit, and estimate a location of the display device 100 by using a time of arrival of the radio waves from the GPS satellites to the display device 100.

The I/O module 160 may include at least one selected from a plurality of buttons 161, the microphone 162, the speaker 163, the vibration motor 164, the connector 165, and the keypad 166.

The button 161 may be formed at a front surface, a side surface, or a back surface of a housing of the display device 100, and may include at least one selected from a power/lock button (not shown), a volume button (not shown), a menu button, a home button, a back button, and a search button.

The microphone 162 may be controlled by the controller 110 and receive voice or sound and generate electric signals.

The speaker 163 may be controlled by the controller 110 and output sounds that correspond to various signals of the mobile communication module 120, the sub-communication module 130, the multimedia module 140, or the camera module 150 to the outside of the display device 100. The speaker 163 may output sounds that correspond to functions of the display device 100. The speaker 163 may be formed of one or a plurality of speakers at an appropriate location or appropriate locations on the housing of the display device 100.

The vibration motor 164 may be controlled by the controller 110 and convert electric signals to mechanical vibrations. For example, when the display device 100 receives a voice call from another device (not shown) in a vibration mode, the vibration motor 164 may operate. The vibration motor 164 may operate in response to a touch operation of a user that contacts the touch screen 190 and consecutive movements of a touch input on the touch screen 190.

The connector 165 may be used as an interface for connecting the display device 100 and an external device (not shown) or a power source (not shown). Under the control of the controller 110, data stored in the storage 175 of the display device 100 may be transmitted to the external device (not shown) or data may be received from the external device (not shown) via a cable connected to the connector 165. Power may be input from the power source (not shown) or a battery (not shown) may be charged via the cable connected to the connector 165.

The keypad 166 may receive a key input from the user to control the display device 100. The keypad 166 includes a physical keypad (not shown) that is formed on the display device 100 or a virtual keypad (not shown) that is displayed on the touch screen 190. The physical keypad (not shown) formed on the display device 100 may be omitted depending on the performance or a structure of the display device 100.

The sensor module 170 includes at least one sensor that detects status of the display device 100. For example, the sensor module 170 may include a proximity sensor (not shown) that detects whether the user is near the display device 100, an illuminator sensor (not shown) that detects an amount of light around the display device 100, or a motion sensor (not shown) that detects motions (e.g., rotations of the display device 100, or acceleration or vibration applied to the display device 100) of the display device 100. The sensors of the sensor module 170 may be added or removed according to the performance of the display device 100.

The storage 175 may be controlled by the controller 110 and store signals or data that are input/output with respect to operations of the mobile communication module 120, the sub-communication module 130, the multimedia module 140, the camera module 150, the GPS module 155, the I/O module 160, the sensor module 170, and the touch screen 190. The storage 175 may store a control program for controlling the display device 100 or the controller 110, and applications.

The term "storage" may include the storage 175, the ROM 112 and the RAM 113 in the controller 110, or a memory card (not shown) inserted into the display device 100. The storage may include a non-volatile memory, a volatile memory, a hard disk drive (HDD), or a solid state drive (SSD).

The power supplier 180 may be controlled by the controller 110 and supply power to at least one battery (not shown) that is located in the housing of the display device 100. Also, the power supplier 180 may supply power that is input from an external power source (not shown) to components in the display device 100 via the cable connected to the connector 165.

The touch screen 190 may output user interfaces that correspond to various services to the user. The touch screen 190 may transmit analog signals, which correspond to at least one touch that is input to a user interface, to the touch screen controller 195. The touch screen 190 may receive at least one touch input via the body (e.g., a finger) of the user or a touch input tool (e.g., a stylus pen). Also, the touch screen 190 may receive consecutive motions of the at least one touch input. The touch screen 190 may transmit analog signals that correspond to the consecutive motions of the touch input to the touch screen controller 195.

A touch input according to the embodiments is not limited to an input that transmitted when the body of the user or a touch input tool contacts the touch screen 190, and may include a non-contact input (e.g., a distance between the touch screen 190 and the body is 1 mm or less). A distance that may be detected on the touch screen 190 may vary according to the performance or the structure of the display device 100.

The touch screen 190 may be, for example, a resistive type, a capacitive type, an infrared type, or an ultrasound wave type, but is not limited thereto.

The touch screen controller 195 may convert the analog signals received from the touch screen 190 into digital signals (e.g., X-coordinates and Y-coordinates) and transmit the digital signals to the controller 110. The controller 110 may control the touch screen 190 by using the digital signals from the touch screen controller 195. For example, the controller 110 may select an application execution icon (not shown) displayed on the touch screen 190 or execute an application in response to a touch input. The touch screen controller 195 may be included in the touch screen 190 or the controller 110.

FIGS. 2A through 2E are conceptual diagrams for describing a method of displaying application execution windows, according to an embodiment. A display device 200 may be formed as not only a mobile device described with reference to FIG. 1, but also a TV or a medical data display apparatus.

Figure 2A:
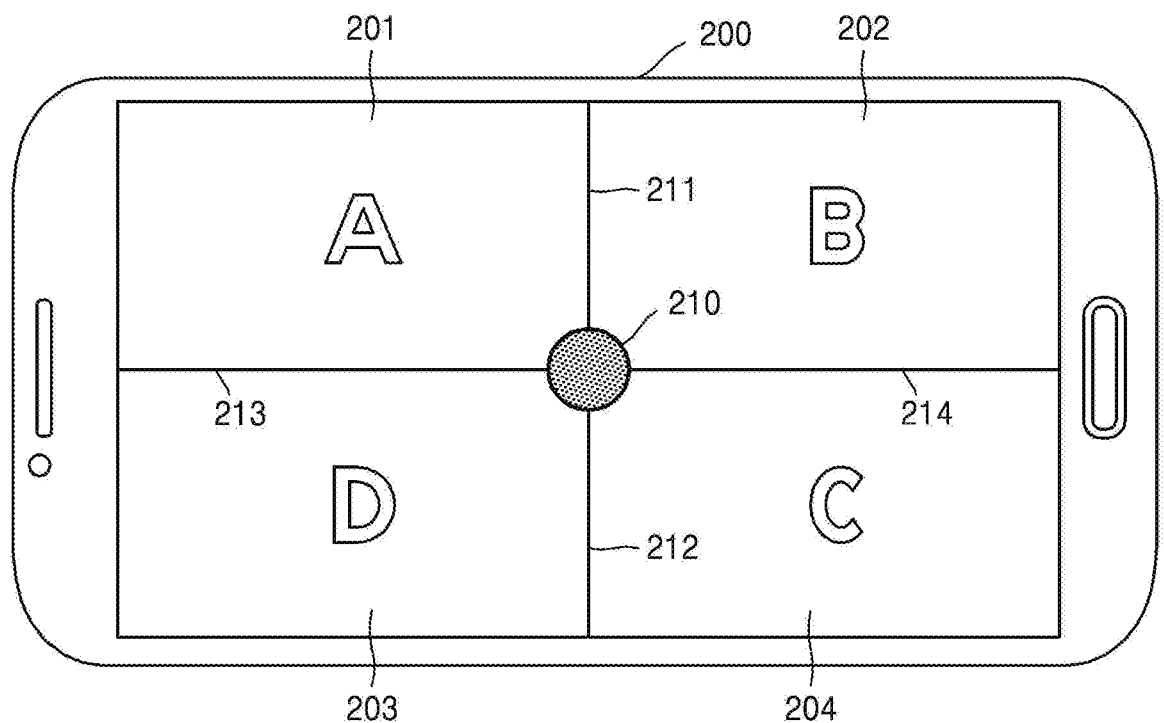
FIGS. 2A through 2E are conceptual diagrams for describing a method of displaying application execution windows, according to an embodiment.

As shown in FIG. 2A, the display device 200 may set a plurality of regions (201 to 204) on a touch screen. For convenience of description, in the present specification, the regions set by the display device 200 are indicated as a first region 201, a second region 202, a third region 203, and a fourth region 204. Also, a region formed by combining the first and third regions 201 and 203 is indicated as a fifth region (not shown). A region formed by combining the second and fourth regions 202 and 204 is indicated as a sixth region (not shown). A region formed by combining the first and second regions 201 and 202 is indicated as a seventh region. A region formed by combining the third and fourth regions 203 and 204 is indicated as an eighth region. A combination of the first to fourth regions 201 to 204, i.e., a full screen, is indicated as an F region. A controller (not shown) may set a first boundary line 211 that divides the first and second regions 201 and 202, a second boundary line 212 that divides the third and fourth regions 203 and 204, a third boundary line 213 that divides the first and third regions 201 and 203, and a fourth boundary line 214 that divides the second and fourth regions 202 and 204. The first and second boundary lines 211 and 212 may form a single line. The third and fourth boundary lines 213 and 214 may form a single line. The first to fourth boundary lines 211 to 214 do not have to be always displayed, but may be lines that are virtually set on the display device 200. The controller (not shown) may set the first to fourth regions 201 to 204 such that the first to fourth regions 201 to 204 do not overlap each other. For example, as shown in FIG. 2A, the controller (not shown) may set the first region 201 at an upper left end. The controller (not shown) may set the second region 202 at an upper right end. The controller (not shown) may set the third region 203 at a lower left end. The controller (not shown) may set the fourth region 204 at a lower right end. The controller (not shown) may set the first and second boundary lines 211 and 212 such that a screen is vertically divided. The controller (not shown) may set the third and fourth boundary lines 213 and 214 such that the screen is horizontally divided.

Also, the touch screen may display a button 210 at a point where the first to fourth boundary lines 211 to 214 meet. The button 210 may be a function key for changing a size of a region displaying an application execution window or entering an operation mode of controlling the execution window.

The controller (not shown) may control the touch screen such that an application execution window is displayed on each region. For example, the controller (not shown) may control the touch screen such that an application execution window is displayed on each of the plurality of regions (201 to 204) as shown in FIGS. 2B to 2K.

In the present specification, an application execution window indicates a window that displays an application execution screen. That is, an "execution window" may indicate a type of a frame that displays an execution screen of a corresponding application. Objects related to an application may be displayed on an execution screen of the application. The objects may include text, figures, icons, buttons, check boxes, images, videos, the web, or a map. When a user touches an object, a function or an event that is preset to the object may be performed. The object may be referred to as 'view' according to operating systems. For example, at least one button, from among a capture button for capturing the execution window, a minimize button for minimizing the execution window, a full screen button for maximizing the execution window, and a close button for closing the execution window, may be displayed for controlling the display of an execution window.

Figure 2B:
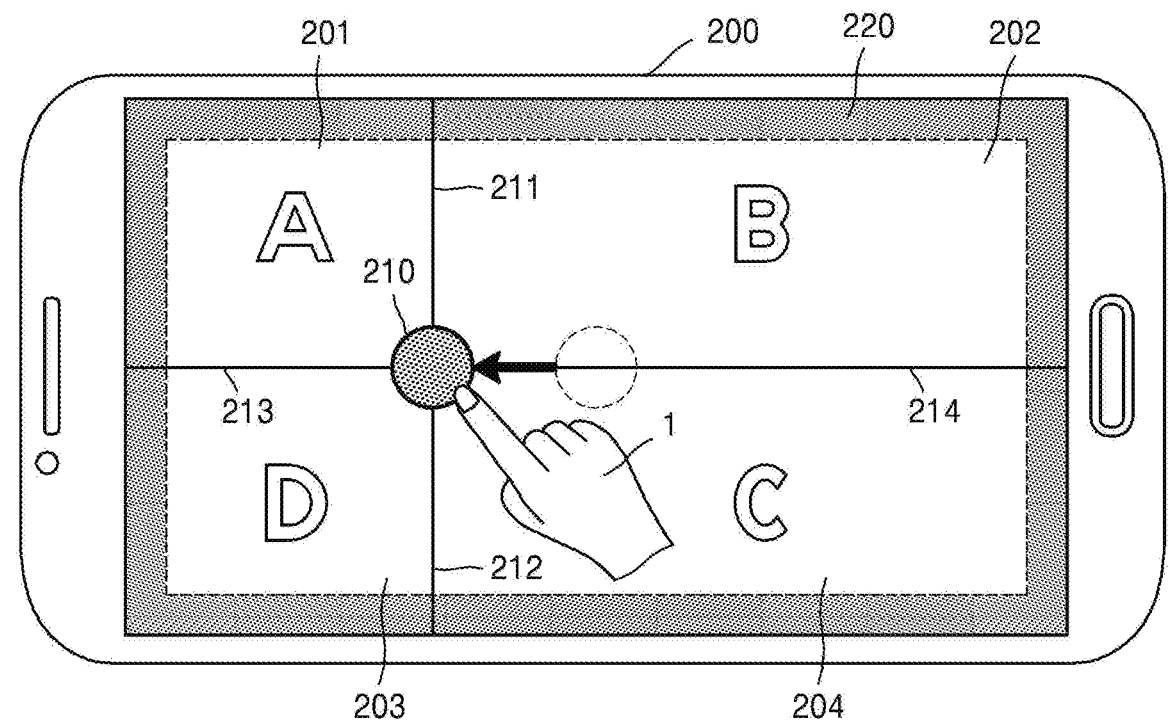

Referring to FIG. 2B, the controller (not shown) may set an edge region 220 with respect to the touch screen of the display device 200. In the present specification, the edge region 220 may mean a region within a certain distance from an edge of the touch screen.

The touch screen may receive a touch input moving a button 210 displayed on the touch screen of the display device 200 from a user 1. For example, the touch input dragging the button 210 is recognized from the user 1, and thus the display device 200 may change a position of the button 210 to a position at which the touch input is recognized.

Based on the position of the button 210, the controller (not shown) may reset and display the regions 201 through 204 and the boundary lines 211 through 214 that display application execution windows.

Figure 2C:
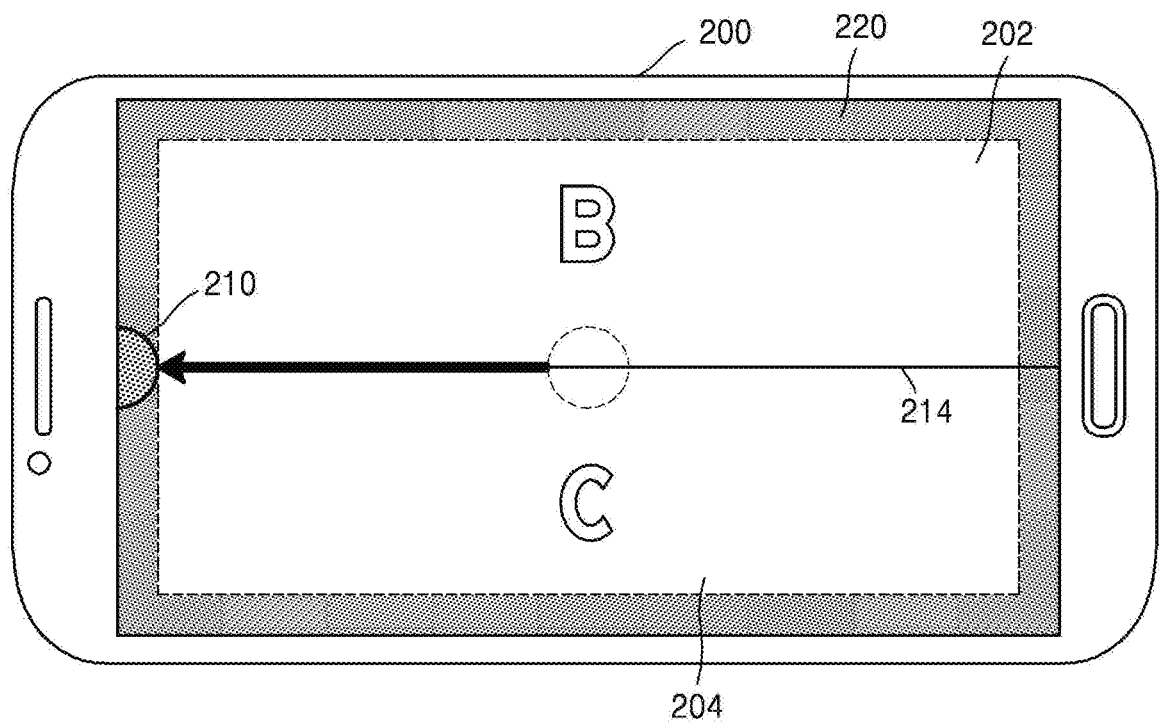

In this regard, as shown in FIG. 2C, when the button 210 is positioned in the edge region 220, the display device 200 may not display regions displaying some application execution windows on the touch screen. That is, among the regions 201 through 204 shown in FIG. 2B, the region 201 displaying an execution window of an A application and the region 203 displaying an execution window of a D application. The display device 200 may split a screen based on the boundary line 214. The display device 200 may display an execution window 202 of a B application and an execution window 204 of a C application on the split screens.

According to an embodiment, when a fling gesture is recognized through a touch screen, the display device 200 may move the button 210 to the edge region 220 along a direction of the fling gesture. In the present specification, the fling gesture is an input to move a point where a user contacts a touch screen with an acceleration greater than a preset threshold value. The fling gesture may include information regarding a direction. For example, the controller (not shown) may determine a direction from a start point of a touch input constituting the fling gesture to an end point of the touch input as the direction of the fling gesture. When the fling gesture has a left direction, the display device 200 may display the button 210 on a left edge of the touch screen as shown in FIG. 2C. The display device 200 may split a screen based on the position of the button 210 and display an execution window of an application on each of the split screens.

Figure 2D:
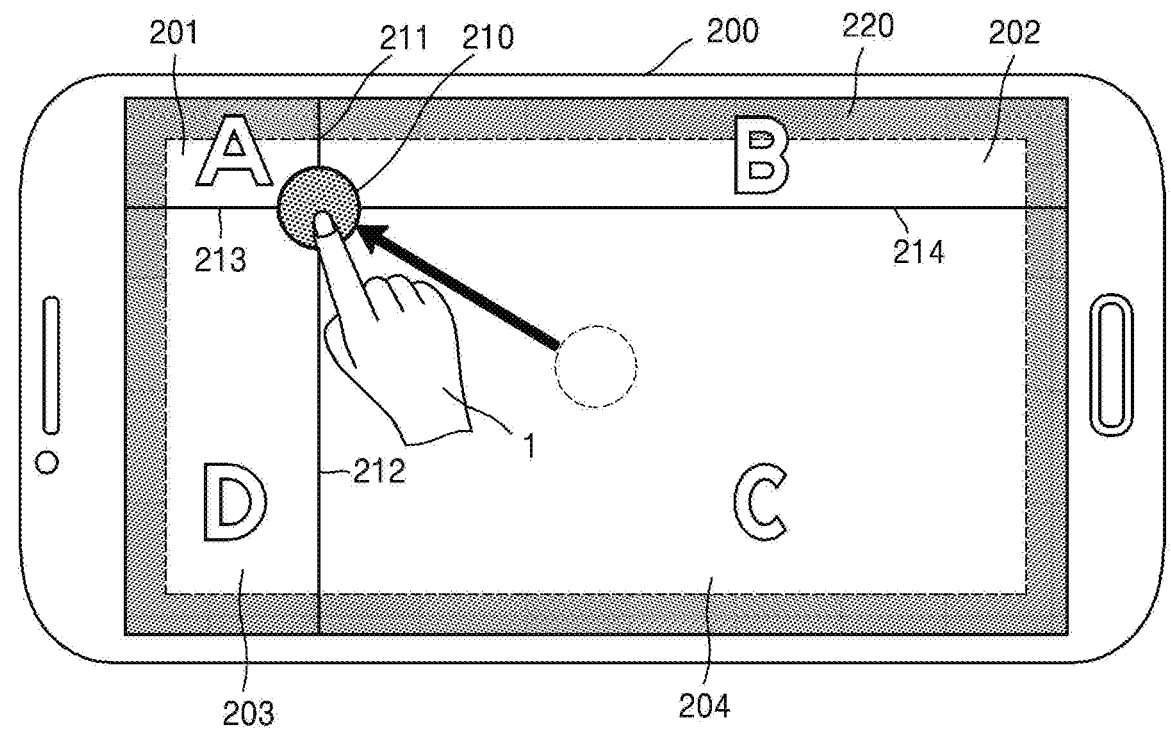
Figure 2E:
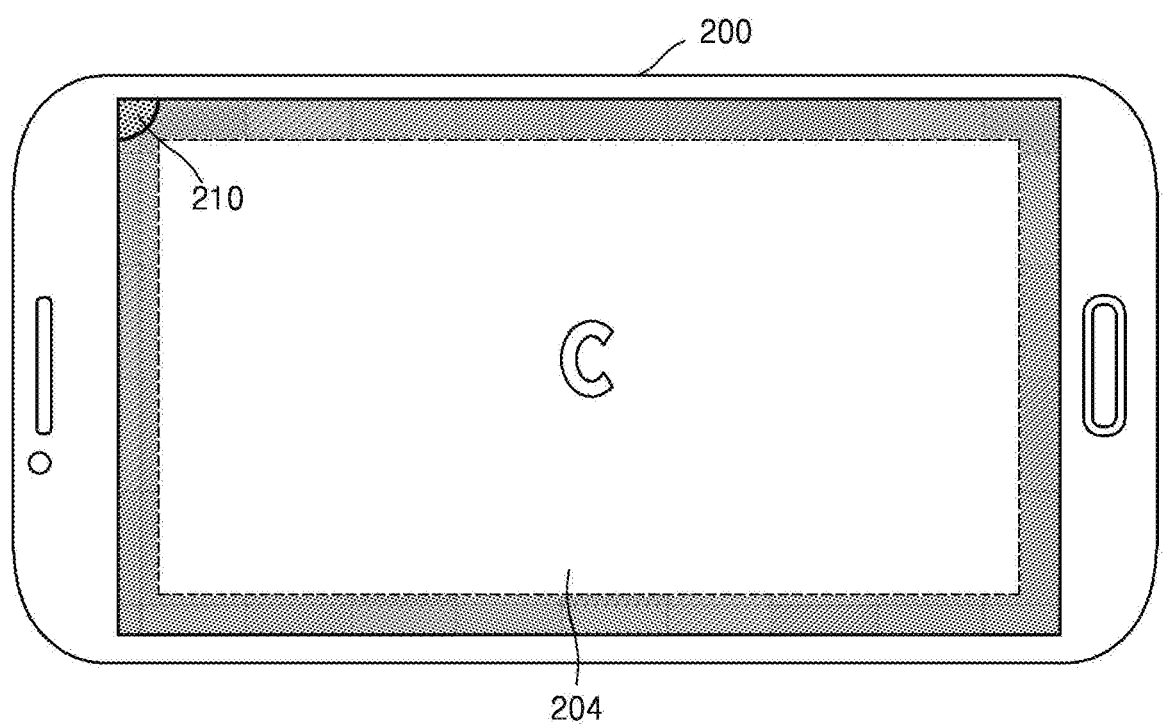

The button 210 may move not only up and down left and right but also, as shown in FIG. 2D, in an arbitrary direction. When the fling gesture has a direction corresponding to a left upper corner of the touch screen, the display device 200 may display the button 210 on the left upper corner of the touch screen as shown in FIG. 2C. In this regard, the display device 200 may display the execution window 204 of the C application on an entire region of the touch screen.

FIGS. 3A through 3E are conceptual diagrams for describing a method of moving positions of buttons, according to an embodiment.

Figure 3A:
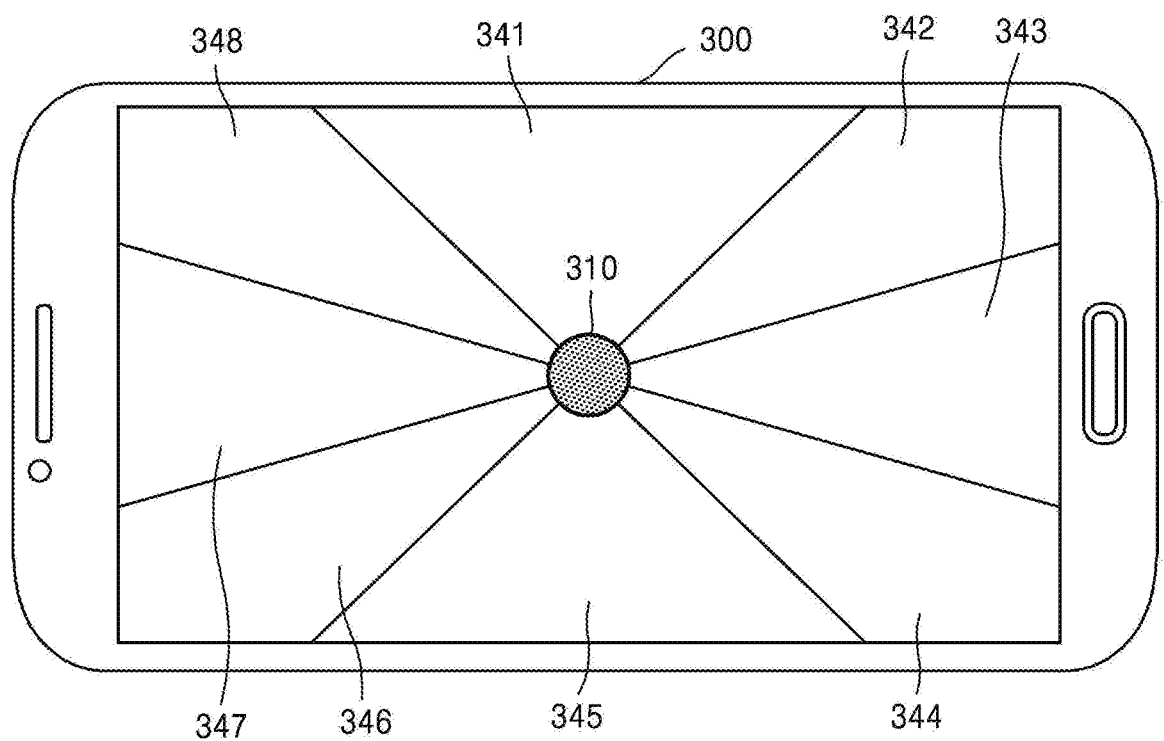

Referring to FIG. 3A, a display device 300 may display a button 310 on a touch screen. A controller (not shown) included in the display device 300 may display execution windows of a plurality of applications as shown in FIGS. 2A through 2E based on a position of the button 310.

The controller (not shown) may split the touch screen into a plurality of regions 341 through 348 based on a position displaying the button 310, separately from a region displaying an execution window of an application.

According to an embodiment, the touch screen may be split into the plurality of regions 341 through 348 by lines connecting a plurality of preset points in an edge region of the touch screen from the position displaying the button 310.

Figure 3B:
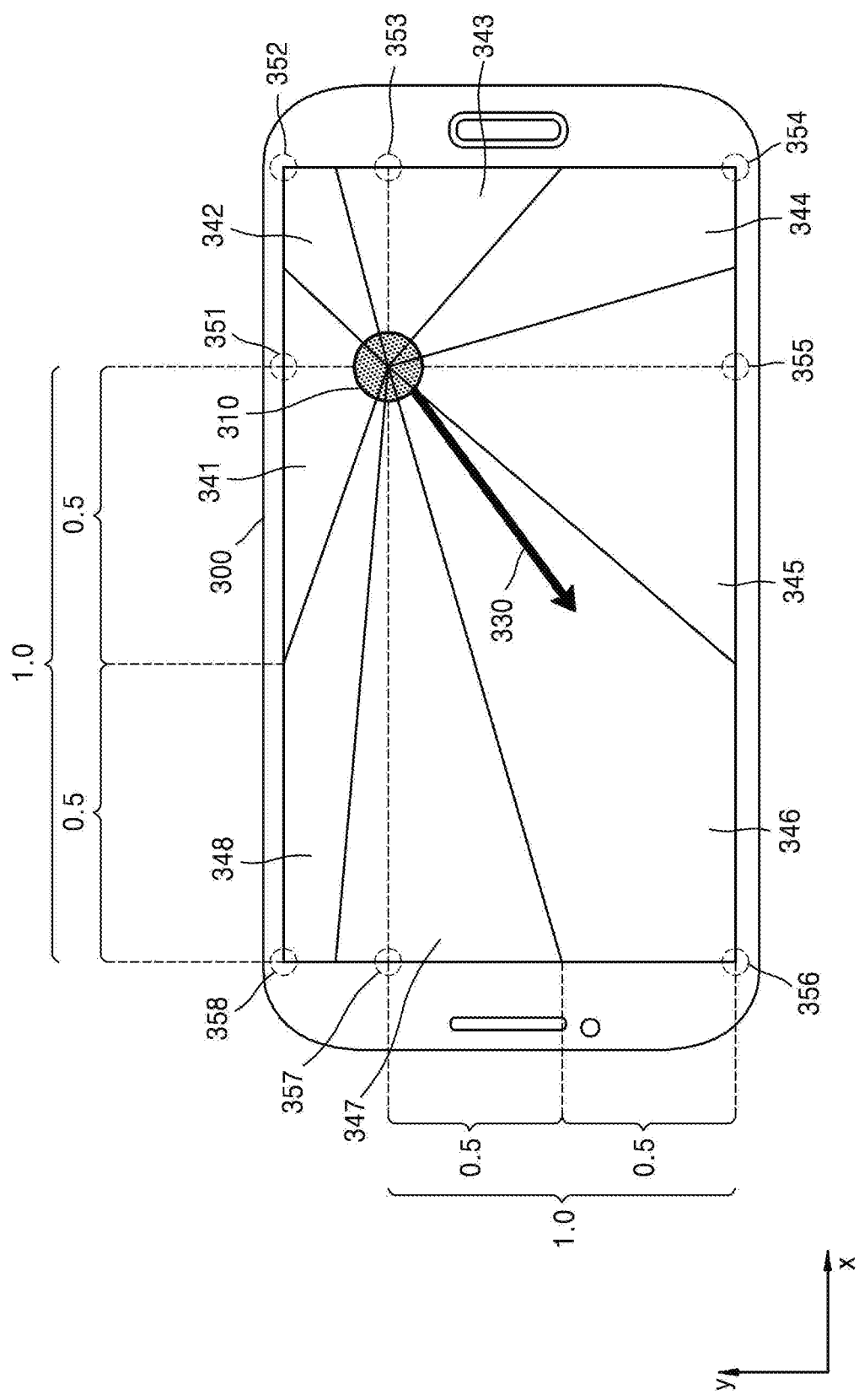

Referring to FIG. 3B, when a button movement acceleration value is greater than a preset threshold value by a fling gesture input to the touch screen, the controller (not shown) included in the display device 300 may obtain an inclination value of the fling gesture. The inclination value of the fling gesture may mean an inclination value of a line connecting start and end points of a touch input. The controller (not shown) may determine a direction 330 of the fling gesture based on the obtained inclination value.

Thereafter, the controller (not shown) may control the touch screen to move the button 310 to one of certain positions 351 through 358 based on the direction 330 of the fling gesture. According to an embodiment, the certain positions 351 through 358 may be included in an edge region (not shown). The certain positions 351 through 358 may include the positions 351 and 355 corresponding to x axial coordinates on the touch screen displaying the button 310, the positions 353 and 357 corresponding to y axis coordinates on the touch screen displaying the button 310, and the positions 352, 354, 356, and 358 corresponding to corners of the touch screen in the edge region (not shown). The x and y axes may be different according to embodiments.

The controller (not shown) may split a position of the button 310 and the touch screen into a plurality of regions 341 through 348 based on the position of the button 310. According to an embodiment, the controller (not shown) may split the touch screen into the plurality of regions 341 through 348 based on the certain positions 351 through 358 determined according to the position of the button 310 in the edge region of the touch screen from the position displaying the button 310. That is, the touch screen may be split based on a boundary line between a middle point of the first point 351 and the second point 352 and a point displaying the button 310. The touch screen may also be split based on as a boundary line between a middle point of the second point 352 and the third point 353 and the point displaying the button 310. The touch screen may also be split based on as a boundary line between a middle point of the third point 353 and the fourth point 354 and the point displaying the button 310. The touch screen may also be split based on as a boundary line between a middle point of the fourth point 354 and the fifth point 355 and the point displaying the button 310. The touch screen may also be split based on as a boundary line between a middle point of the fifth point 355 and the sixth point 356 and the point displaying the button 310. The touch screen may be also split based on as a boundary line between a middle point of the sixth point 356 and the seventh point 357 and the point displaying the button 310. The touch screen may also be split based on as a boundary line between a middle point of the seventh point 357 and the eighth point 358 and the point displaying the button 310. The touch screen may be also split based on as a boundary line between a middle point of the eighth point 358 and the first point 351 and the point displaying the button 310.

The regions 341 through 348 illustrated in FIGS. 3A through 3E are examples for describing the embodiments. The controller (not shown) may split the touch screen by using different methods according to embodiments. For example, as shown in FIG. 3A, the controller (not shown) may split the touch screen into a greater or smaller number of regions than 8 regions.

The fling gesture may be input, and thus the controller (not shown) may obtain an inclination value of a line connecting start and end points of the fling gesture. That is, the controller (not shown) may obtain the inclination value from a difference between an x coordinate and a y coordinate between the start and end points of the fling gesture. In the present specification, the inclination value may be referred to as an inclination value of the touch input or the inclination value of the fling gesture.

Figure 3C:
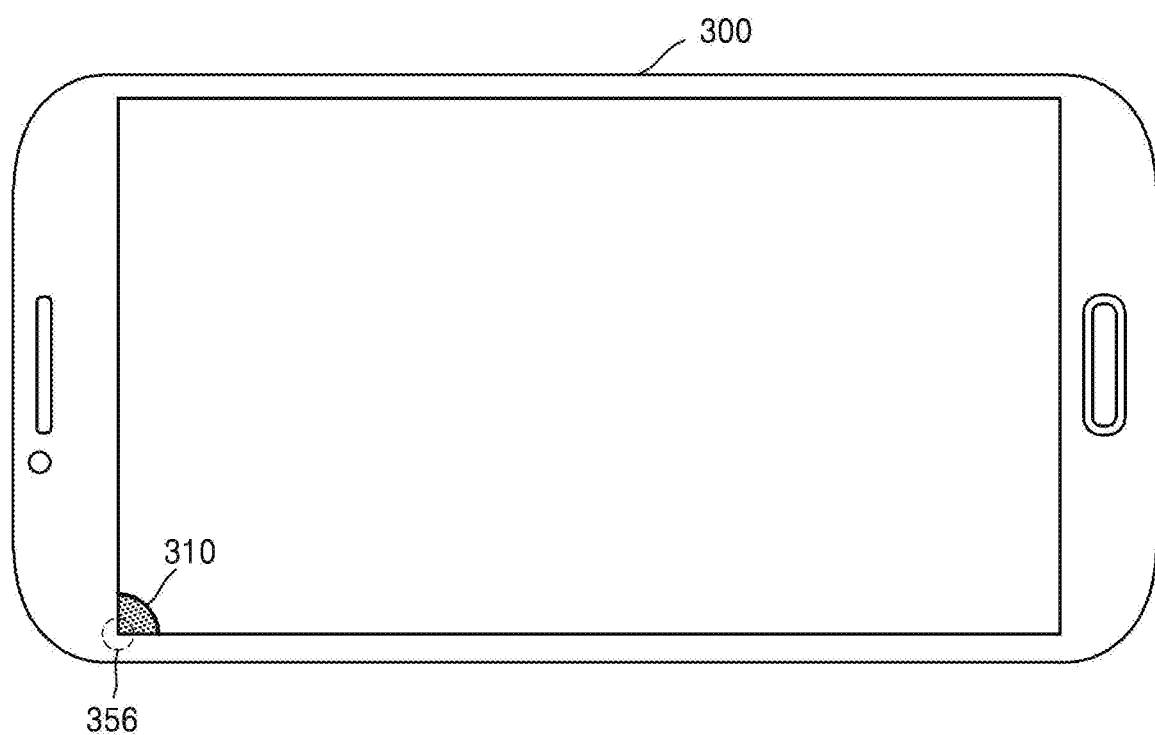
Figure 3E:
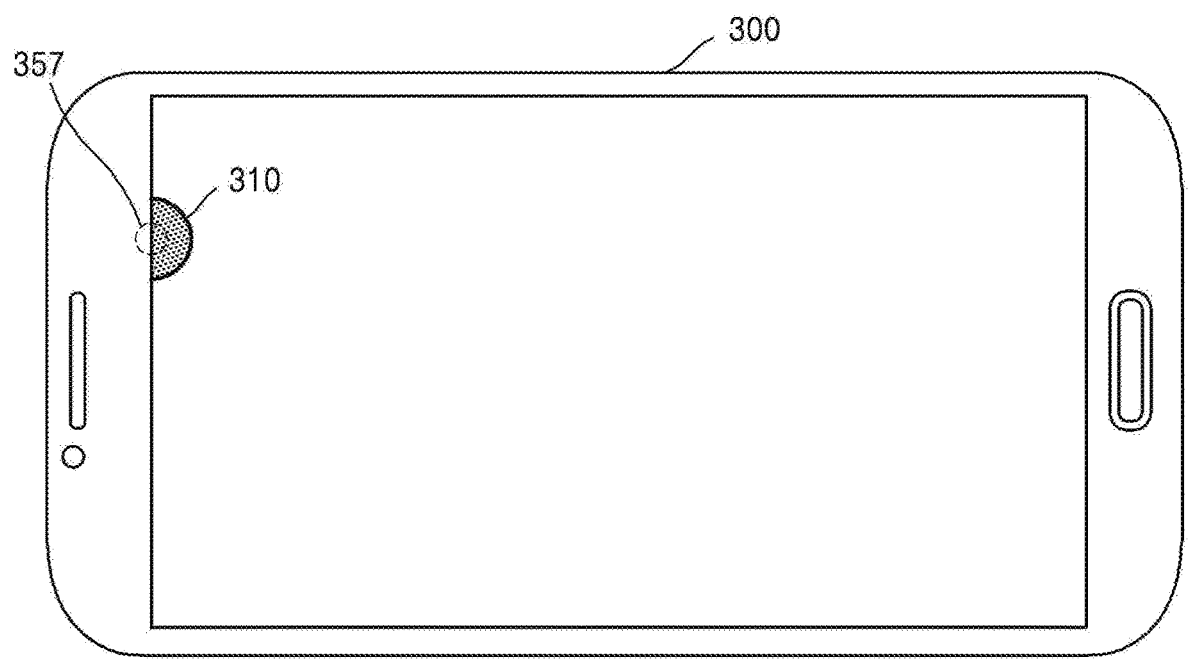

Thereafter, the controller (not shown) may select a region corresponding to the inclination value from among the split regions 341 through 348. In FIG. 3B, the controller (not shown) may select the region 346 including the direction 330 of the fling gesture. Thereafter, as shown in FIG. 3C, the controller (not shown) may move the button 310 to the certain position 356 included in the selected region 346. The controller (not shown) may control the touch screen to display the button 310 on the position 356. In FIG. 3D, the controller (not shown) may select the region 347 including a direction 331 of the fling gesture. Thereafter, as shown in FIG. 3E, the controller (not shown) may move the button 310 to the certain position 357 included in the selected region 347. The controller (not shown) may control the touch screen to display the button 310 on the position 357.

The display device 300 may move the button 310 to one of the certain positions 351 though 358 included in the edge region, and thus may not display some of the execution windows 201 through 204 of the applications shown in FIG. 2A. Accordingly, the display device 300 may enlarge and display some of the execution windows 201 through 204 of the applications shown in FIG. 2A.

The controller (not shown) may track positions of touches that are continuously input on the touch screen or the position of the button 310. The positions of touches that are continuously input on the touch screen or the position of the button 310 may move, and thus the controller (not shown) may obtain an acceleration value. Thereafter, when the obtained acceleration value is greater than a preset threshold value, the controller (not shown) may determine that the touch input received through the touch screen is the fling gesture. For example, when a user drags the button 310, if a coordinate of the button 310 starts moving by 50 pixels or more per second, the controller (not shown) may determine that the received touch input is the fling gesture. When the received touch input is determined to be the fling gesture, the controller (not shown) may obtain the inclination value of the fling gesture and move the button 310 to a certain position. For convenience of description, the term acceleration has been used to describe the present specification. However, a displacement, a vector, etc. may also be used instead of the acceleration according to embodiments.

Figure 4:
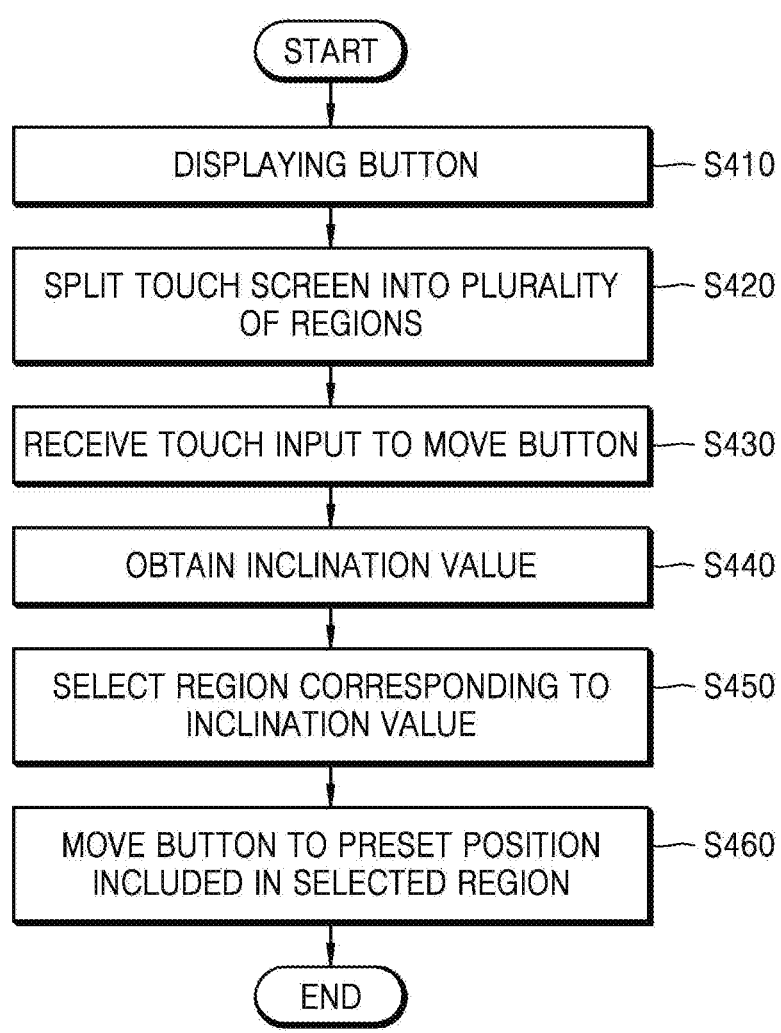
FIG. 4 is a flowchart of a process of displaying a button, according to an embodiment.

FIG. 4 is a flowchart of a process of displaying a button, according to an embodiment.

A display device may display a button on a touch screen (operation S410) and may split the touch screen into a plurality of regions based on a position of the displayed button (operation S420).

Thereafter, the display device may receive a touch input to move the button through the touch screen (operation S430). In this regard, the touch input to move the button may be a drag gesture to change a position where a touch is recognized from a position displaying the button while touch recognition is maintained.

Thereafter, the display device may obtain an inclination value of the touch input (operation S440). The display device may select a region corresponding to the inclination value obtained in operation S440 among the regions split in operation S420 (operation S450).

Thereafter, the display device may move the button to a preset position included in the region selected in operation S450 (operation S460).

Figure 5:
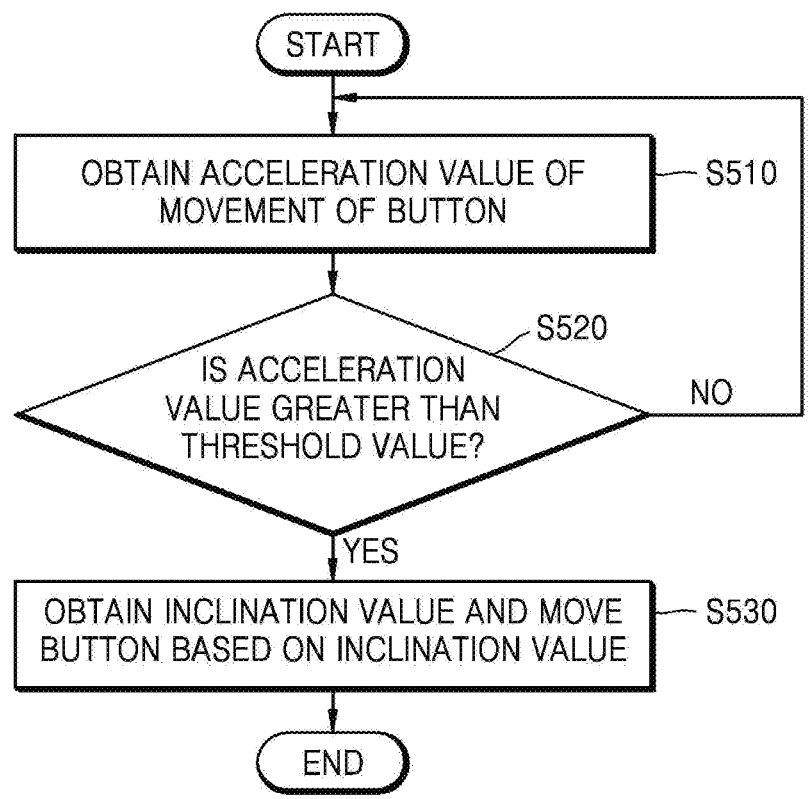
FIG. 5 is a flowchart of a process of recognizing a fling gesture, according to an embodiment.

FIG. 5 is a flowchart of a process of recognizing a fling gesture, according to an embodiment.

In operation S440 of FIG. 4, the display device may obtain a button movement acceleration value (operation S510). According to an embodiment, the button movement acceleration value may be obtained as an acceleration value by calculating a coordinate value of a touch input (operation S510).

Thereafter, the display device may determine whether the acceleration value is greater than a preset threshold value (operation S520). When the acceleration value is greater than the preset threshold value, the display device may determine that the touch input is the fling gesture. When the acceleration value is greater than the preset threshold value, the display device may obtain an inclination value (i.e. an inclination value of the fling gesture) of the touch input in the same manner as in operation S440 through S460. The display device may move the button based on the inclination value.

Figure 6A:
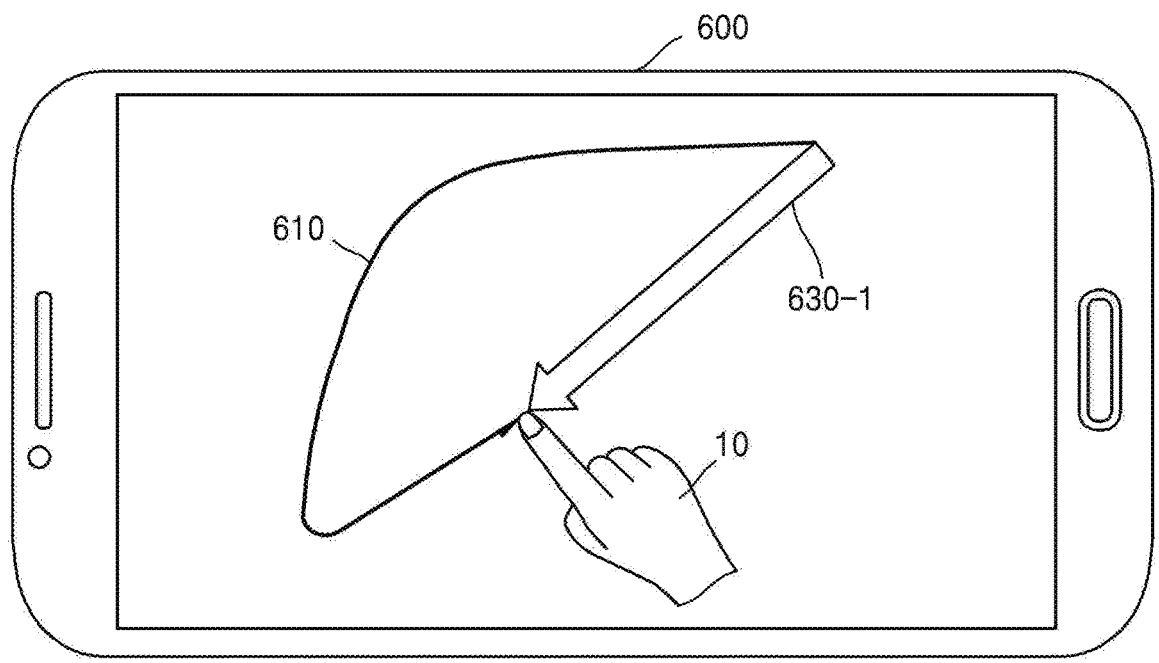
FIGS. 6A through 6C are conceptual diagrams for describing a method of determining a fling direction, according to an embodiment.
Figure 6B:
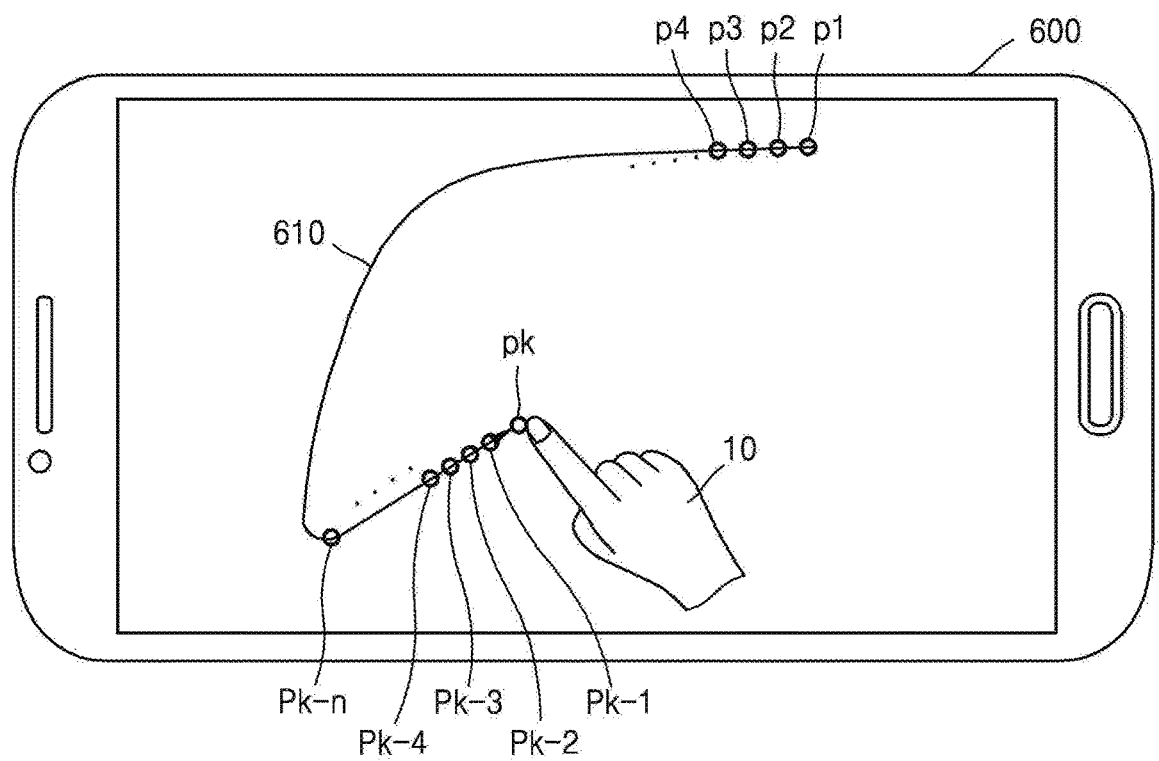
Figure 6C:
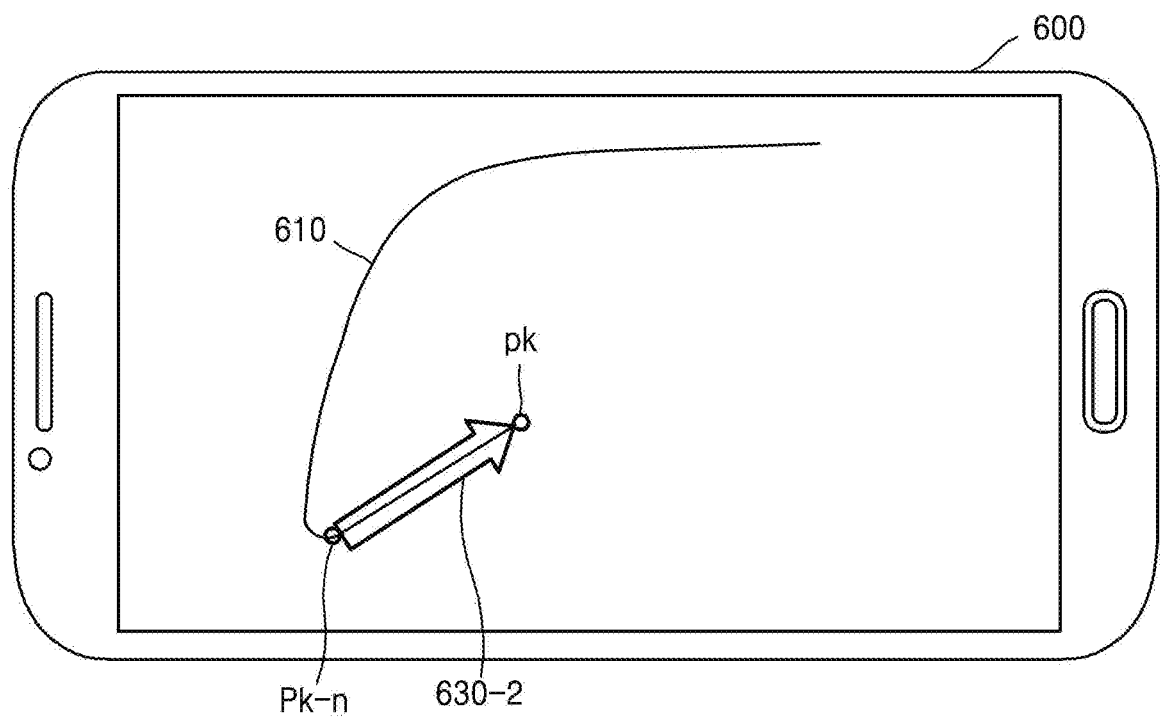

FIGS. 6A through 6C are conceptual diagrams for describing a method of determining a fling direction, according to an embodiment.

As shown in FIG. 6A, a display device 600 may obtain an inclination value of a fling gesture from start and end points of a touch input 610 that is input by a user 10 on a touch screen. The inclination value of the fling gesture may indicate a direction 630-1 of the fling gesture recognized by the display device 600.

However, in this case, there may be a big difference in a direction that is to be finally input by the user 10 and a direction of the fling gesture obtained by the display device 600.

Therefore, according to an embodiment, the display device 600 may determine a coordinate of the touch input 610 prior to a preset number from an end point pk of the touch input 610 as the start point of the touch input 610.

As shown in FIG. 6B, the touch input 610 may include k coordinates p1 through pk received through the touch screen. A controller (not shown) included in the display device 600 may determine a coordinate pk-n of the touch input 610 prior to a preset number (n in FIG. 6B) from the end point pk of the touch input 610 as the start point of the touch input 610.

Referring to FIG. 6C, the coordinate pk-n of the touch input 610 prior to a preset number from the end point pk of the touch input 610 may be determined as the start point of the touch input 610, and thus the display device 600 may obtain the direction of the fling gesture in accordance with a user's intention.

Figure 7:
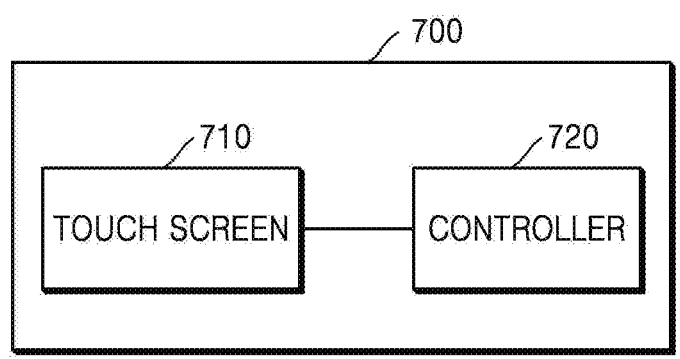
FIG. 7 is a simple block diagram of a display device, according to an embodiment.

FIG. 7 is a simple block diagram of a display device 700, according to an embodiment.

The display device 700 according to an embodiment may include a touch screen 710 displaying a button and a controller 720 splitting the touch screen 710 into a plurality of regions.

In this regard, the touch screen 710 may receive a touch input to move the displayed button. The controller 720 may obtain an inclination value of a line connecting start and end points of the touch input based on the touch input. The controller 720 may select a region corresponding to the inclination value from among the plurality of split regions. The controller 720 may control the touch screen 710 to display the button by moving the button to a certain position included in the selected region.

According to an embodiment, the controller 720 may obtain a movement acceleration value of the button displayed on the touch screen 710. When the acceleration value is greater than a preset threshold value, the controller 720 may control the touch screen 710 to display the button on the certain position. In this regard, the certain position may be included in an edge region of the touch screen 710.

According to another embodiment, the controller 720 may split the touch screen 710 into a plurality of regions by using lines connecting the position displaying the button and a plurality of preset points of the edge region of the touch screen 710.

According to another embodiment, the controller 720 may determine a coordinate of the touch input prior to a preset number from the end point of the touch input as the start point of the touch input.

The display device 700 may include touch screens of various shapes according to embodiments. For example, the display device 700 may include a touch screen having an n angular shape (n is an integer equal to or greater than 3). According to some embodiments, the display device 700 may split the touch screen 710 into 2*n regions with respect to the position of the button and move the position of the button along a direction of a fling gesture.

Figure 8:
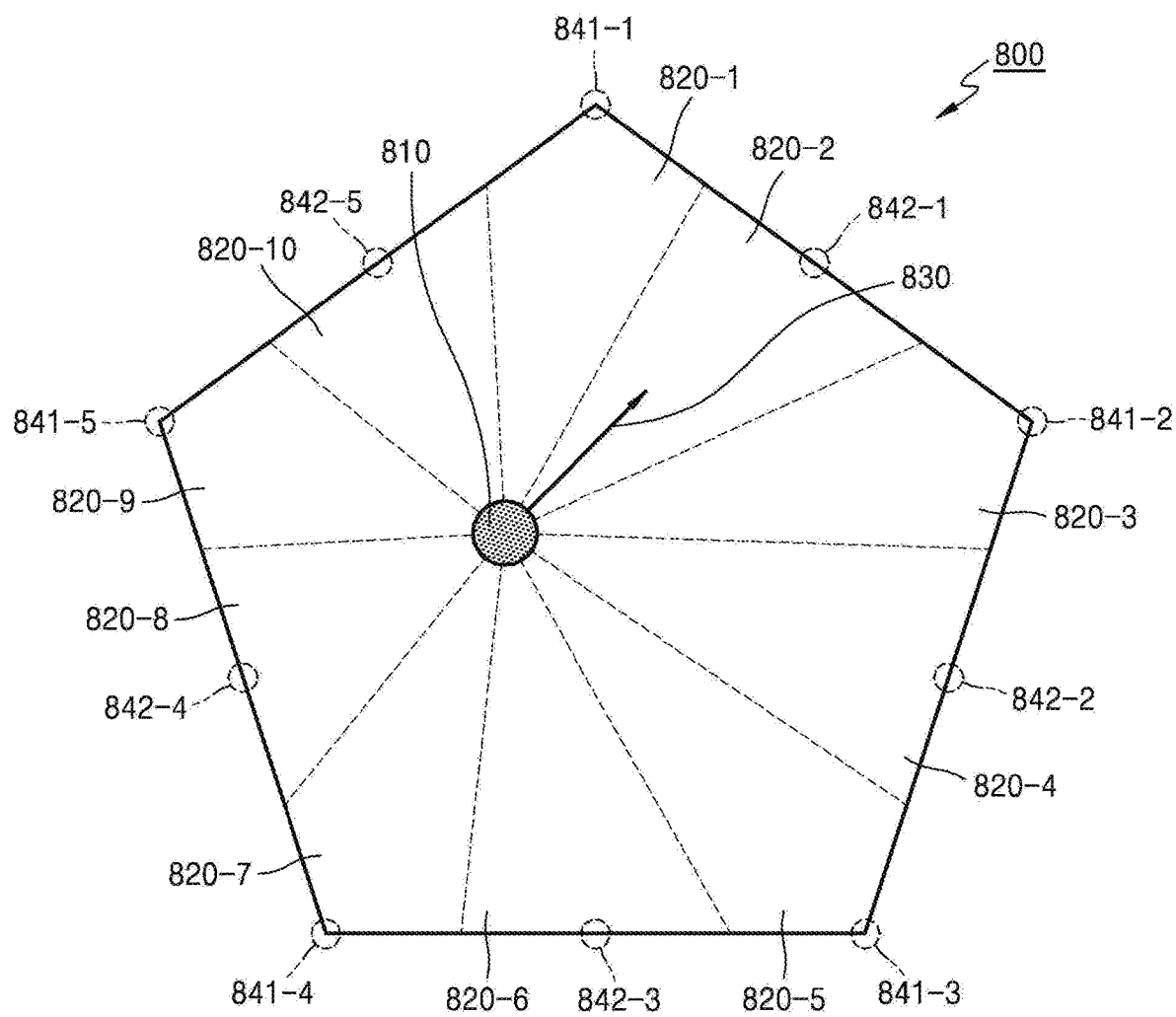
FIG. 8 is a conceptual diagram for describing a method of recognizing a fling gesture performed by a display device, according to another embodiment.

FIG. 8 is a conceptual diagram for describing a method of recognizing a fling gesture performed by a display device 800, according to another embodiment. In more detail, FIG. 8 illustrates the method of recognizing the fling gesture performed by the display device 800 when the display device 800 includes a pentagonal touch screen 800.

When the display device 800 includes the pentagonal touch screen 800, the display device 800 may split the touch screen 800 into 10 regions 820-1, 820-2, 820-3, 820-4, 820-5, 820-6, 820-7, 820-8, 820-9, and 820-10. If the fling gesture is input with respect to a button 810, the display device 800 may determine a direction 830 of the fling gesture in relation to the button 810. If the direction 830 of the fling gesture is determined, the display device 800 may move a position of the button 810 according to a region including the determined direction 830 of the fling gesture among the 10 regions 820-1, 820-2, 820-3, 820-4, 820-5, 820-6, 820-7, 820-8, 820-9, and 820-10. For example, referring to FIG. 8, when the direction 830 of the fling gesture is included in the region 820-2, the display device 800 may move the position of the button 810 to a point 842-1.

Likewise, referring to FIG. 8, when the direction 830 of the fling gesture is included in the region 820-1, the display device 800 may move the position of the button 810 to a point 841-1. When the direction 830 of the fling gesture is included in the region 820-2, the display device 800 may move the position of the button 810 to a point 842-1. When the direction 830 of the fling gesture is included in the region 820-3, the display device 800 may move the position of the button 810 to a point 841-2. When the direction 830 of the fling gesture is included in the region 820-4, the display device 800 may move the position of the button 810 to a point 842-2. When the direction 830 of the fling gesture is included in the region 820-5, the display device 800 may move the position of the button 810 to a point 841-3. When the direction 830 of the fling gesture is included in the region 820-6, the display device 800 may move the position of the button 810 to a point 842-3. When the direction 830 of the fling gesture is included in the region 820-7, the display device 800 may move the position of the button 810 to a point 841-4. When the direction 830 of the fling gesture is included in the region 820-8, the display device 800 may move the position of the button 810 to a point 842-4. When the direction 830 of the fling gesture is included in the region 820-9, the display device 800 may move the position of the button 810 to a point 841-5. When the direction 830 of the fling gesture is included in the region 820-10, the display device 800 may move the position of the button 810 to a point 842-5. FIG. 8 is used to describe some embodiments. The number of regions split on the touch screen 800 and positions of the points 841-1 through 841-5 and 842-1 through 842-5 the button 810 moves may change according to embodiments.

Figure 9:
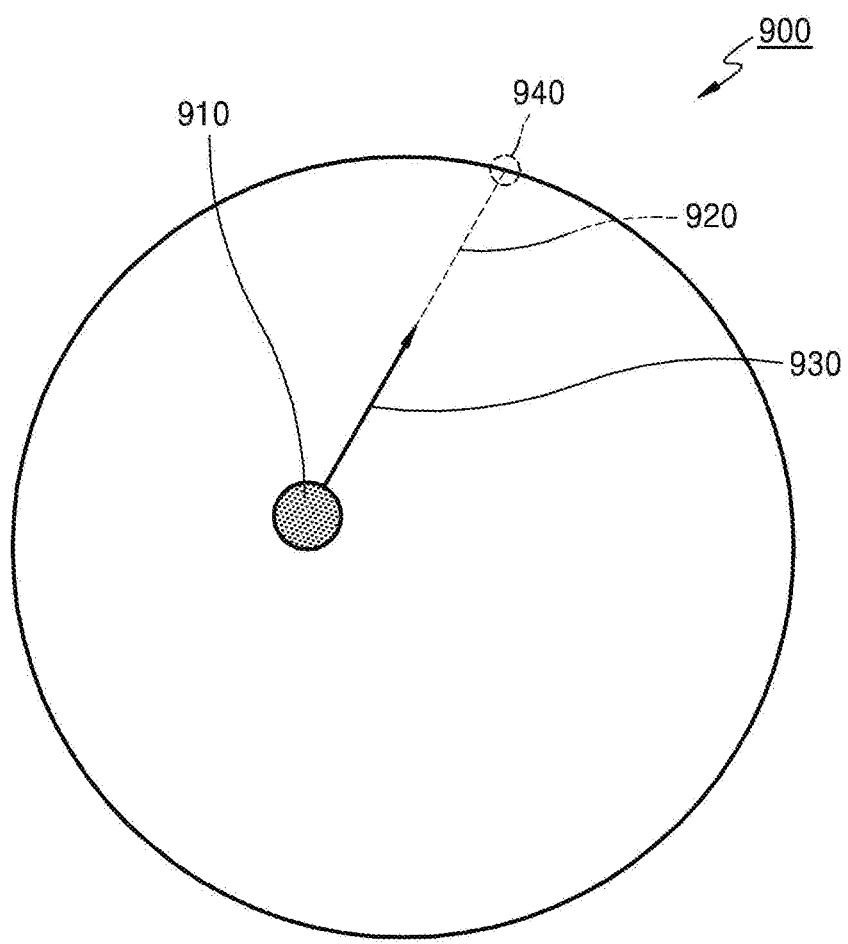
FIG. 9 is a conceptual diagram for describing a method of recognizing a fling gesture performed by a display device, according to another embodiment.

FIG. 9 is a conceptual diagram for describing a method of recognizing a fling gesture performed by a display device, according to another embodiment. In more detail, FIG. 9 is a diagram for describing the method of recognizing the fling gesture performed by the display device when the display device includes a circular touch screen 900.

When the fling gesture is recognized in relation to a position of a button 910, the display device may determine a direction 930 of the fling gesture. The display device may determine a point 940 outside the display device based on a line 920 extending from the position of the button 910 in the direction 930 of the fling gesture. The display device may move the position of the button 910 to the determined point 940. However, FIG. 9 is used to describe some embodiments and is not limited thereto.

Figure 10:
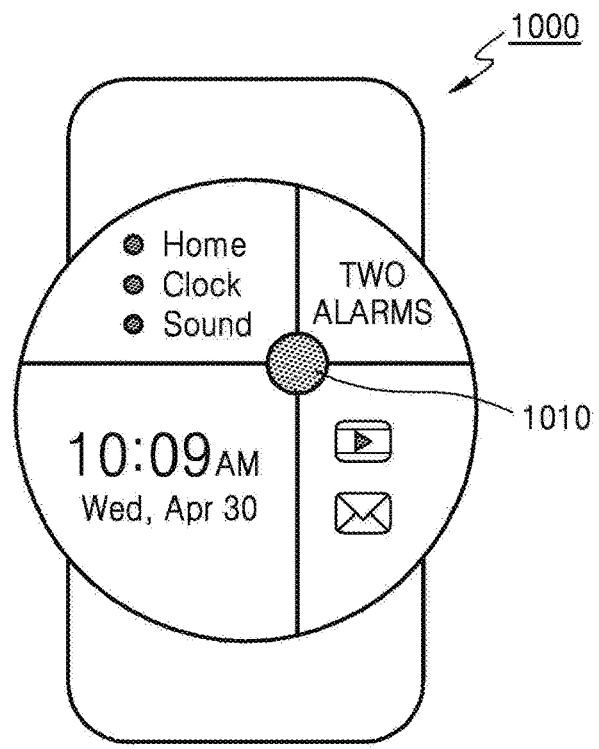
FIGS. 10 through 14 are diagrams of a wearable device as an example of a display device according to embodiments.
Figure 11:
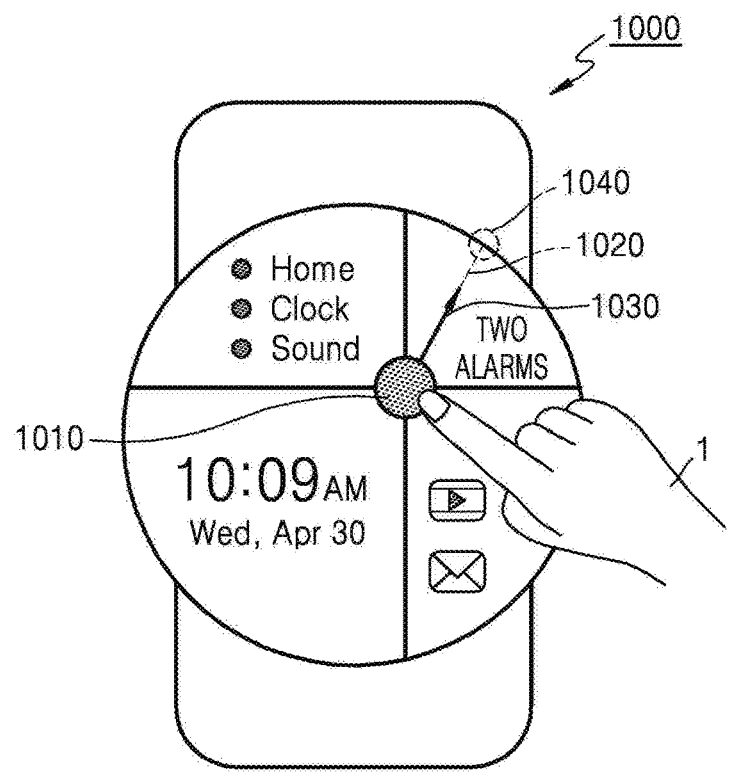
Figure 12:
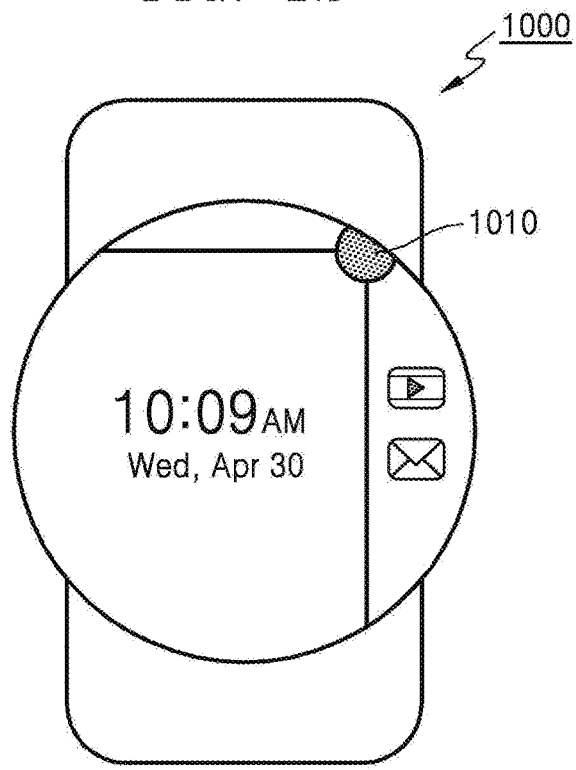

FIGS. 10 through 14 are exemplary diagrams of embodiments in which a display device is a wearable device. In particular, FIGS. 10 through 12 are exemplary diagrams of operations of a display device 1000 including a circular touch screen.

As shown in FIG. 10, the display device 1000 may display a button 1010 on the touch screen. The display device 1000 may display a user interface or an application execution window, etc. on split regions on the touch screen in relation to the button 1010.

As shown in FIG. 11, the user 1 may input a fling gesture with respect to the button 1010 through the touch screen of the display device 1000. If the fling gesture is input, the display device 1000 may determine a point 1040 outside the display device based on a line 1020 extending in a direction 1030 of the fling gesture.

Thereafter, as shown in FIG. 12, the display device 1000 may move the position of the button 1010 to the point 1040 of FIG. 11. The display device 1000 may split the touch screen into regions based on the position of the button 1010 and display the user interface or the application execution window, etc. on the split regions.

Figure 13:
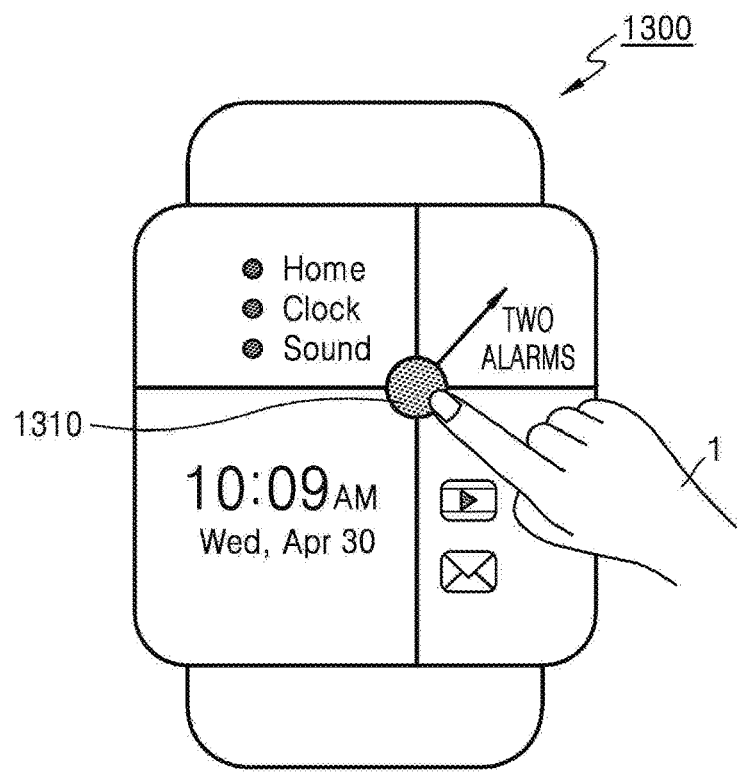
Figure 14:
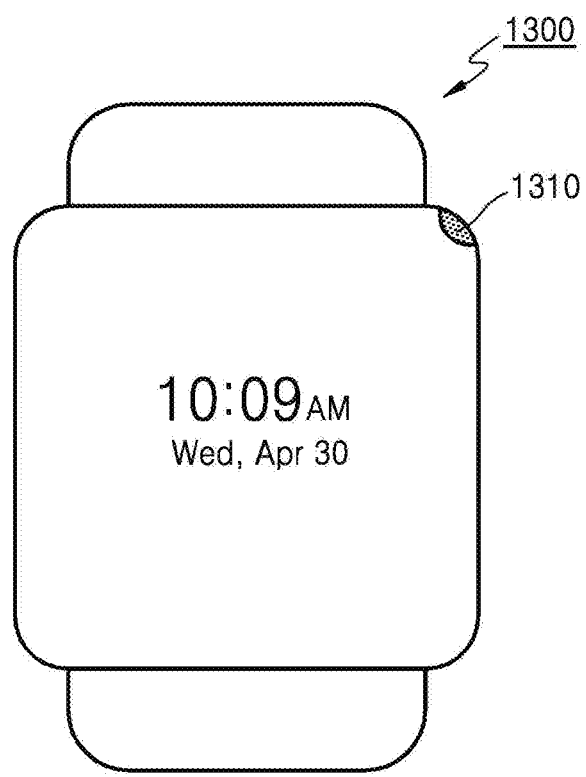

FIGS. 13 and 14 are exemplary diagrams of operations of a display device 1300 including a rectangular touch screen.

As shown in FIG. 13, the display device 1300 may include the rectangular touch screen. The display device 1300 may display a button 1310 on the touch screen. The display device 1300 may display a user interface or an application execution window, etc. on split regions on the touch screen in relation to the button 1310.

If a fling gesture is input from the user 1, as shown in FIG. 14, the display device 1300 may move a position of the button 1310 based on a direction of the fling gesture. The display device 1300 may display the user interface or the application execution window, etc. on an entire region of the touch screen based on the position of the button 1310 or may display the user interface or the application execution window, etc. on the split regions on the touch screen.

As described above, according to the embodiments, a display device may provide a user with a user interface for easily adjusting regions displaying execution windows of a plurality of applications according to a user's intention.

One or more embodiments may be implemented through computer-readable code/instructions, such as a computer-executed program module, stored in/on a medium, e.g., a non-transitory computer-readable medium. The non-transitory computer-readable medium may be a random computer-accessible medium, and may include volatile media, non-volatile media, separable media and/or non-separable media. Also, the computer-readable medium may correspond to any computer storage media and communication media. The computer storage media includes volatile media, non-volatile media, separable media and/or non-separable media which are implemented by using a method or technology for storing information, such as computer-readable code/instructions, data structures, program modules, or other data. The communication media generally includes computer-readable code/instructions, data structures, program modules, or other data of modulated data signals such as carrier waves, or other transmission mechanisms, and random information transmission media. Examples of the computer storage media include ROMs, RAMs, flash memories, CDs, DVDs, magnetic disks, or magnetic tapes. According to an embodiment, a program may be recorded in a computer storage medium, the program which is for executing displaying a button on a touch screen, splitting the touch screen into a plurality of regions based on a position displaying the button, receiving a touch input to move the displayed button, obtaining an inclination value of a line connecting start and end points of the touch input, selecting a region corresponding to the inclination value from among the plurality of split regions, and moving the button to a certain position included in the selected region.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A method of displaying a screen on a display device comprising a touch screen, the method comprising:
   displaying a button on the touch screen, the button being a reference for a boundary of a plurality of application execution windows;
   defining a plurality of split regions based on the displayed button, each of the plurality of split regions including a predetermined button position point, wherein the plurality of split regions are distinguished from the plurality of application execution windows;
   receiving a touch input to move the displayed button;
   determining a slope of a line connecting start and end points of the touch input in response to receiving the touch input;
   selecting a region, from among the plurality of defined split regions, based on the slope; and
   displaying the button at the predetermined button position point of the selected region.

2. The method of claim 1, further comprising:
   obtaining an acceleration value associated with the touch input,
   wherein the determining of the slope comprises determining the slope when the acceleration value is greater than a preset threshold value.

3. The method of claim 1, wherein the predetermined button position point of each of the plurality of split regions is included in an edge region of the touch screen.

4. The method of claim 1, wherein the defining of the plurality of split regions comprises:
   defining boundary lines associated with at least one of the plurality of split regions based on a position of the button and a location of the predetermined button position point associated with at least one of the plurality of defined split regions.

5. The method of claim 1, wherein the determining of the slope further comprises:
   determining a coordinate of the touch input prior to a preset number of coordinate values from the end point of the touch input, and
   identifying the coordinate of the touch input prior to a preset number of coordinate values from the end point as the start point of the touch input.

6. A display device comprising:
   a touch screen; and
   at least one processor configured to:
      display a button on the touch screen, the button being a reference for a boundary of a plurality of application execution windows,
      define a plurality of split regions based on the displayed button, each of the plurality of split regions including a predetermined button position point, wherein the plurality of split regions are distinguished from the plurality of application execution windows,
      receive a touch input to move the displayed button,
      determine a slope of a line connecting start and end points of the touch input in response to receiving the touch input,
      select a region, from among the plurality of defined split regions, based on the slope, and
      control the touch screen to display the button at the predetermined button position point of the selected region.

7. The display device of claim 6, wherein the at least one processor is further configured to obtain an acceleration value associated with the touch input, and, when the acceleration value is greater than a preset threshold value, to control the touch screen to display the button at the predetermined button position point.

8. The display device of claim 6, wherein the predetermined button position point of each of the plurality of split regions is in an edge region of the touch screen.

9. The display device of claim 6, wherein the defining of the plurality of split regions comprises:
   defining boundary lines associated with at least one of the plurality of split regions based on a position of the button and a location of the predetermined button position point associated with at least one of the plurality of defined split regions.

10. The display device of claim 6, wherein the at least one processor is further configured to:
    determine a coordinate of the touch input before a preset number of coordinate values from the end point of the touch input, and
    identify the coordinate of the touch input prior to a preset number of coordinate values from the end point as the start point of the touch input.

11. A non-transitory computer-readable recording medium configured to store one or more computer programs including instructions that, when executed by at least one processor, cause the at least one processor to control for:
    displaying a button on the touch screen, the button being a reference for a boundary of a plurality of application execution windows;
    defining a plurality of split regions based on the displayed button, each of the plurality of split regions including a predetermined button position point wherein the plurality of split regions are distinguished from the plurality of application execution windows;

receiving a touch input to move the displayed button;
determining a slope of a line connecting start and end points of the touch input in response to receiving the touch input;
selecting a region, from among a plurality of split regions, based on the slope; and
displaying the button at the predetermined button position point of the selected region.

\* \* \* \* \*